Figure 1:
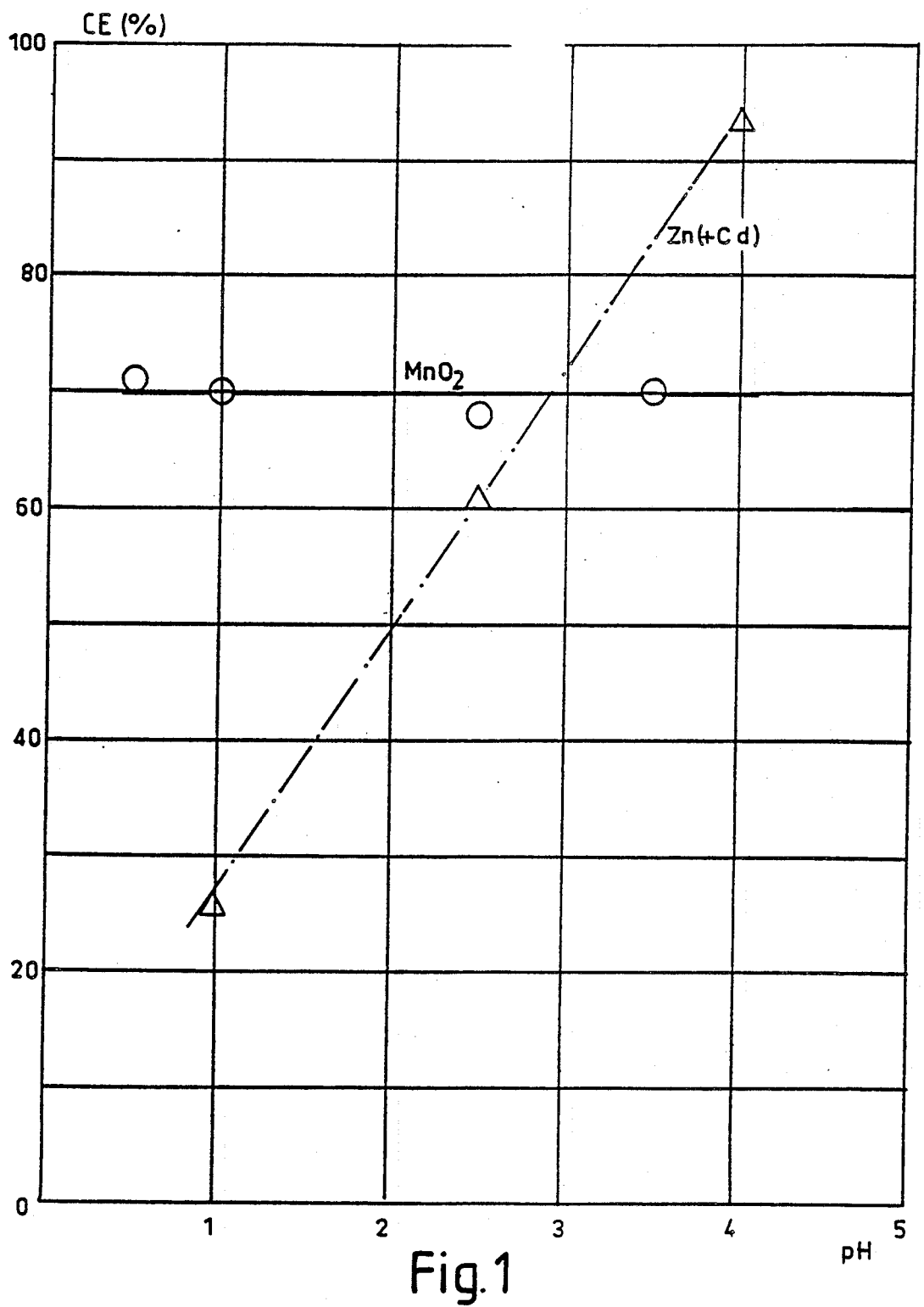

United States Patent [19]

Nguyen

[11] Patent Number: 4,992,149

[45] Date of Patent: Feb. 12, 1991

[54] PROCESS FOR THE SIMULTANEOUS RECOVERY OF MANGANESE DIOXIDE AND ZINC

[75] Inventor: Trong T. Nguyen, Onex, Switzerland

[73] Assignee: Recytec S.A., Switzerland

[21] Appl. No.: 553,719

[22] Filed: Jul. 16, 1990

[30] Foreign Application Priority Data

Jul. 20, 1989 [CH] Switzerland .................. 2713/89

[51] Int. Cl.$^5$ .................... C25B 1/00; C25C 1/16
[52] U.S. Cl. ...................... 204/96; 204/114
[58] Field of Search .................. 204/96, 114

[56] References Cited

U.S. PATENT DOCUMENTS

| 3,438,878 | 4/1969 | Bell et al. | 204/83 |
| 4,071,421 | 1/1978 | Masters et al. | 204/96 |
| 4,818,354 | 4/1989 | Preisler et al. | 204/96 |
| 4,863,817 | 9/1989 | Ogino et al. | 429/194 |

FOREIGN PATENT DOCUMENTS 814412  6/1969  Canada ...................... 204/63

Primary Examiner—G. L. Kaplan
Attorney, Agent, or Firm—Kane, Dalsimer, Sullivan, Kurucz, Levy, Eisele and Richard

[57] ABSTRACT

A process for the simultaneous electrolytic production of manganese dioxide and zinc from a mixture, preferably waste material consisting of spent batteries and other electronic components, contains various manganese oxides and zinc in various chemical forms, wherein the mixture is leached with an acidic solvent comprising tetrafluoroboric acid and, preferably, a reducing agent and boric acid, and subjected to an electrolysis in which zinc is plated on the cathode and manganese dioxide is plated on the anode.

25 Claims, 2 Drawing Sheets

PROCESS FOR THE SIMULTANEOUS RECOVERY OF MANGANESE DIOXIDE AND ZINC

DESCRIPTION

1. Field of the Invention

This invention relates to a process for the simultaneous electrolytic production of manganese dioxide and zinc. It relates particularly to an electrolytic process for simultaneously producing battery grade $MnO_2$ and commercially pure Zn metal. According to another aspect, the invention relates to the recycling of a waste comprising spent electrical batteries of any construction size and chemical composition, and also assembled printed circuit boards and electronic components, said waste containing manganese oxides and zinc in various chemical forms.

2. Prior Art

Information on possible compositions of various electric batteries is given, for example, in:

"Gerätebatterien; Grundlagen und Theorie, sowie der aktuelle technische Stand und Entwicklungstendenzen" ("Batteries for Equipment; Principles and Theory, State of the Art and Development Frends") by H. A. KIEHNE et al., Export Verlag GmbH, 1983.

A typical composition of one ton of spent small batteries is as follows:

270 kg manganese oxides
210 kg iron
60 kg zinc
60 kg coal
35 kg ammonium chloride
20 kg copper
0 kg potassium hydroxide
3 kg mercury
0.5 kg cadmium
0.3 kg silver In presence of a mixed waste including electronic components, the amount of noble metals (like chromium, nickel, gold, etc. . . ) increases.

In his earlier patent application No. 4 960/86-0, the applicant discloses a process for the recycling of electrical batteries, in particular of a mixture of high-power batteries of any chemical composition and also of assembled printed circuit boards and electronic components, in which the starting materials are heated and metals present in the residue are electrolytically deposited, wherein:

(a) a pyrolysis of the unsorted mixture is carried out at a temperature between 450° C. and 650° C., then (b) an electrolysis of the pyrolysis sludge is carried out and, subsequently, (c) a separation of the electrolysis products and removal of the products accumulating at the electrodes is carried out.

In a preferred embodiment of this process, tetrafluoroboric acid ($HBF_4$, sometimes called borofluoric acid or fluoboric acid) is always used as a leaching, washing and dissolving agent, and as an electrolyte.

In this process, manganese oxides may be recovered as a sludge after a washing step which follows the pyrolysis. In this sludge, manganese occurs in its different oxidation states (such as $Mn_2O$, $Mn_2O_3$, $Mn_3O_4$, $MnO_2$, etc. . . ) and contains impurities such as Fe, Zn, and some heavy metals. This mixture of manganese oxides and impurities must be further purified by known chemical or electrochemical processes in order to recover and produce pure $MnO_2$, which can be used in steelworks or in battery manufacture (in this latter case, preferably in its gamma crystalline form).

Processes for recovering battery-grade $MnO_2$ have been described in the past. They generally consist of the following steps:

(a) reducing the oxides to MnO
(b) leaching the MnO with dilute sulfuric acid to produce a manganese sulfate solution
(c) plating manganese dioxide in an electrolysis cell.

U.S. Pat. No. 1,055,158 (French) describes an electrolytic process for producing zinc and manganese dioxide in the presence of sodium sulfate, resulting in a low-density form of manganese dioxide. U.S. Pat. No. 3,438,878 (Bell and Brown) discloses an electrolytic process which produces gamma-type manganese dioxide and zinc simultaneously in an electrolysis cell from an aqueous solution consisting essentially of manganese sulfate and zinc sulfate.

Zinc occurs, in the applicant's patent No. 4 960/860, in the form of zinc tetrafluoroborate ($Zn(BF_4)_2$) during several steps and can be recovered electrolytically. It thus appears desirable to develop a process for the simultaneous recovery and production of $MnO_2$ and Zn.

SUBJECT OF THE INVENTION

The subject of the present invention is a process for the simultaneous electrolytic production of manganese dioxide and zinc comprising:

leaching manganese oxides, zinc oxides, zinc halides and metallic zinc in an acidic solvent comprising tetrafluoroboric acid, subjecting a solution comprising essentially manganese tetrafluoroborate and zinc tetrafluoroborate to an electrolysis in an electrolytic cell having a cathode upon which zinc can be plated and an anode upon which manganese dioxide can be plated.

The choice of $HBF_4$ as solvent and electrolyte rather than other acids such as $H_2SO_4$, offers the following advantages:

a higher solubility of most metals
$HBF_4$ can be regenerated by distillation
$HBF_4$ is a good galvanoplastic solvent
this choice is perfectly compatible with the other steps of the previously disclosed process.

According to a preferred embodiment, the acidic solvent, comprising tetrafluoroboric acid, also comprises a reducing agent, preferably hydrogen peroxide $H_2O_2$ (formaldehyde may also be used). It has been found that this considerably accelerates the dissolution of the manganese oxides, probably according to reaction mechanisms such as $$Mn_2O_e + H_2O_2 + H^+ \rightarrow 2Mn^{2+} + 3OH^- + O_2$$

or $$MnO_2 + H_2O_2 + 2H^+ \rightarrow Mn^{2+} + O_2 + 2H_2O$$

It has been found that $O_2$ is evolved and that the pH increases during dissolution.

According to another preferred embodiment of the present invention, boric acid, $H_3BO_3$, is added to the $HBF_4$ solution. This prevents significant anode corrosion which is probably due to presence of $F^-$ ions. In fact, as well as the normal acid dissociation of $HBF_4$ according to the mechanism $$HBF_4 \rightleftharpoons H^+ + BF_4^-$$

HBF₄ can also dissociate according to the mechanism

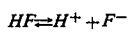

The presence of H₃BO₃ prevents this corrosion, according to the mechanism

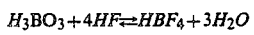

A further advantage of H₃BO₃ is that, since most metal borates are poorly soluble in water and are displaced by HBF₄, the boric acid does not compete with the fluoboric acid in the dissolution of metals and manganese oxide and completely fulfils its role as an inhibitor of anode corrosion.

These features and advantages and optimum operating conditions will be better understood by considering the results shown in the examples given below.

EXAMPLE I

Solvent effect on MnO₂ deposition:

The solutions are prepared by dissolving the Mn oxide powders, previously washed in water and dried in hot air, in different acidic solutions. Generally, an excess of powder is used and the final solutions are considered to be completely saturated. The leaching operation is conducted between 65 and 75° C. for at least 3 hours.

The electrolyses are performed under the following conditions:
Volume: 500 ml
Cathode: stainless steel, cathodic current density=20 mA/cm²
Anode: graphite; anodic current density=20 mA/cm²
Temperature, Agitation: Room temp.; moderate stirring
Cell voltage: 4.0 to 4.2 volts.

TABLE I

| | | Results: | | |
|---|---|---|---|---|
| | | | Current Efficiency (CE) | |
| Solvent | Mn content (g/l) | initial pH of electrolysis | CE(MnO₂) (%) | CE(Zn) (%) |
| 10% HBF₄ | 15.5 | 4.5 | Corrosion of graphite | 81 |
| 10% HBF₄ + 20 g/l H₃BO₃ | 16.2 | 4.0 | 20 | 85 |

The current efficiencies (CE) listed in Table 1 are the average values obtained during one hour of electrolysis, while the pH of the electrolyte decreases from the initial value to about 2.0.

The results show that the presence of H₃BO₃ in HBF₄ can completely inhibit the corrosion of the graphite anode.

In fact, in 10% HBF₄ without boric acid the corrosion of graphite seems to occur at a potential which is more negative than that for the oxidation of Mn(II) and Mn(III) to Mn(IV).

Under the present experimental conditions, the results obtained in 10% HBF₄ containing 20g/l H₃BO₃ are quite satisfactory.

EXAMPLE II

Electrolysis at Different Temperatures

The tests are performed with a solution resulting from the chemical leaching of Mn oxide powders in 15% HBF₄ containing 30 g/l H₃BO₃.

The electrolyses are conducted for one hour for each test the corresponding pH range is from about 2.5 to 1.0. After each electrolysis, the pH and Zn, Mn content are readjusted by a new leaching step at 65°–75° C. for 2 hours.

The tests are performed at a constant current density of 20 mA/cm². The results are listed in TABLE 2.

TABLE 2

| The effects of temperature on MnO₂ and Zn deposition. | | | | |
|---|---|---|---|---|
| Operating temp. (°C.) | pH range | cell voltage | CE(MnO₂) (%) | CE(Zn) (%) |
| 22 | 2.5–1.0 | 4.0 | 27.0 | 87.5 |
| 55 | 2.2–1.0 | 3.5 | 39.0 | 60.0 |
| 75 | 2.2–1.0 | 3.5 | 50.0 | 53.5 |

These results show that the current efficiency (MnO₂) increases considerably as the temperature increases (up to 75°–90° C.). Furthermore, a high operating temperature is necessary for causing MnO₂ to crystallize in the gamma form.

By contrast, an increase in temperature leads to a decrease in the Zn current efficiency. This may be due to an increase in the proton activity resulting from a displacement of the dissociation equilibrium of HBF₄ at high temperatures.

For practical reasons (problems of evaporation and HBF₄ decomposition at too high a temperature), and in order maintain the stationary operating conditions (cathodic CE temperature of 75°–80° C. is the optimum condition.

EXAMPLE III

Electrolysis at different pHs

The tests are performed at 75° C. with an anodic current density of 15 mA/cm². A similar current density is applied to the cathode.

As the pH of the electrolyte decreases during the electrolysis, the operating pH is thus maintained constant, at ±0.2 unit, by the chemical dissolution of Zn during the operation. It is noted that, in this process, the pH of the electrolyte is controlled by the total metal content. Thus, a decrease in pH automatically leads to a decrease in Zn content in solution if the Mn content is kept constant at different acidities.

The results illustrated in FIG. 1 show that, in a range from 0.5 to 4.0, the pH does not have any influence on the MnO₂ CE. By contrast, it significantly influences the cathodic CE. This is probably due to the competition between Zn⁺⁺ discharge and H⁺ discharge which favours the latter because of the decrease in Zn⁺⁺ content and the increase in H⁺ activity at low pH.

In this process, the operating pH should be a compromise which make it possible to obtain:
a reasonable cathodic CE
a reasonable leaching rate for Mn oxide powder.

According to these results, and taking these two factors into account, it appears that an operating pH between 1.0 and 3.0 is appropriate. This corresponds to an extraction factor of Mn and Zn of about −15 to 20%.

EXAMPLE IV

Electrolysis at Different Anodic Current Densities

Figure 2:
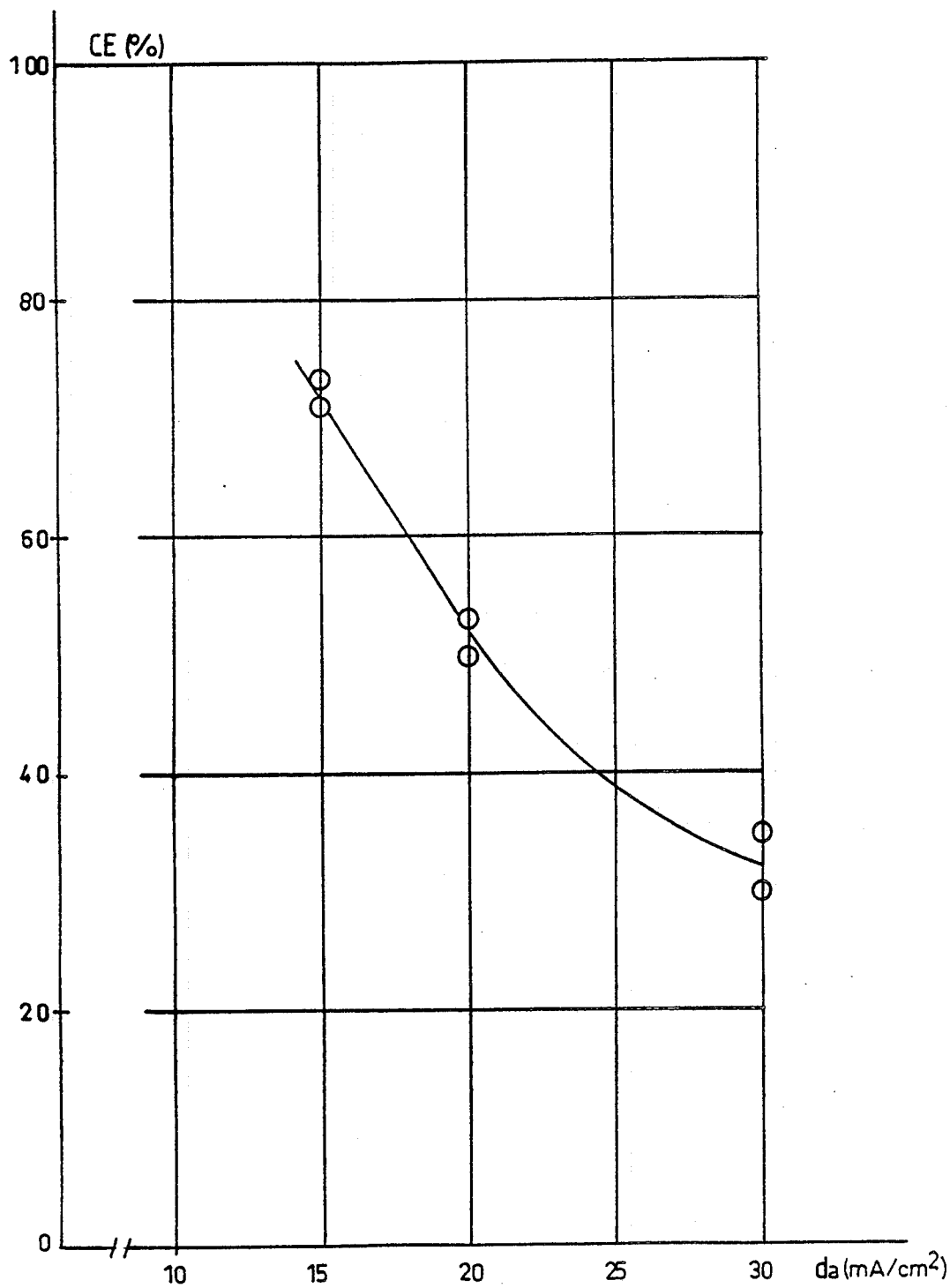

The tests are performed under the conditions described previously. The operating temperature is maintained at 75° C. The results are illustrated in FIG. 2.

These results show that the $MnO_2$ CE decreases with an increase in the anodic current density from 15 to 30 mA/cm$^2$. It is probable that better results could be obtained at lower current densities. However, as the production rate (and therefore the investment and operating costs) decreases in proportion to the applied current density, it is reasonable to maintain the anodic current density at 15 mA/cm$^2$.

EXAMPLE V

Electrolysis with Different Anode Materials

The tests are performed in a solution of $HBF_4$ containing 30 g/l of $H_3BO_3$. The solutions contain about 42 g/l Zn and 20 g/l Mn, the pH being between 2.0 and 2.5. The operating temperature and the anodic current density are 75° C. and 15 mA/cm$^2$ respectively. The results are listed in Table 3.

Titanium coated with ruthenium or iridium oxides is commercially available, for example, as "DSA" (DSA is a trademark of ELTECH SYSTEM CORP., OHIO, U.S.A.)

TABLE 3

Effect of anode materials on the $MnO_2$ deposition.

| Anode material | Results |
|---|---|
| Commercial Ti | Good formation of $MnO_2$ - Anode passivated after 10-15 min. Cell voltage increases up to 20 V. |
| Ti with a suboxidized surface layer | Passivation of anode, cell voltage increases immediately up to 20 V. |
| Ti coated with Ru, Ir oxides. | Good formation of $MnO_2$; dense hard layer; no corrosion of anode. |
| Graphite | Good formation of $MnO_2$, dense hard layer - No corrosion of anode. |
| Stainless steel | No formation of $MnO_2$ - Corrosion of anode. |
| Commercial Pb | Formation of porous $MnO_2$ with dissolution of Pb underneath. |

Chemical Purity of the Products

The chemical purity of the $MnO_2$ and Zn deposited is monitored by AA analysis of a representative sample (dissolved in HCl, $H_2O_2$). As regards $MnO_2$, the deposit is removed from the graphite anode by scratching. The $MnO_2$ powder is washed in water and dried in air. The dissolution is performed in 20% HCl containing about 5% $H_2O_2$. The analysis results are listed in Table 4.

TABLE 4

Chemical purity of $MnO_2$ and Zn.

| Element (w %) | Mn | Fe | Cd | Zn |
|---|---|---|---|---|
| $MnO_2$ | 99.177 | 0.083 | 0.020 | 0.720 |
| Zn | 0.039 | 0.072 | 0.445 | 99.444 |

The following parameters are used in the inventive process:

Manganese tetrafluoroborate concentration—0.2–2 M.

Initial tetrafluoroboric acid concentration—0.5–6 M, preferably 1–5M.

Boric acid concentration—5–30 g/l pH—1–4, preferably 1–3.

Temperature 50–90° C., preferably 75°–80° C.

Current Density 10ma–50ma/cm$^2$.

I claim:

1. A process for the simultaneous electrolytic production of manganese dioxide and zinc, characterized in that manganese oxides, zinc oxides, zinc halides, and metallic zinc are leached in an acidic solvent comprising tetrafluoroboric acid, and in that a solution comprising essentially manganese tetrafluoroborate and zinc tetrafluoroborate is subjected to an electrolysis in an electrolytic cell having a cathode upon which zinc can be plated and an anode upon which manganese dioxide can be plated.

2. A process as claimed in claim 1, wherein said mixed solution subjected to an electrolysis further comprises a component selected from the group consisting of boric acid and boric acid/borate buffers.

3. A process as claimed in claim 2 wherein said acidic solvent comprises a reducing agent which reacts with manganese which is in an oxidation state higher than +2.

4. A process as claimed in claim 3, wherein said reducing agent is hydrogen peroxide or formaldehyde.

5. A process as claimed in claim 4, wherein said acidic solvent comprises boric acid in a concentration of between about 5 and 30 grams per liter.

6. A process as claimed in claim 5, in which the initial concentration of tetrafluoroboric acid in said acidic solvent is between 0.5 and 6 molar.

7. A process as claimed in claim 6, in which the concentration of tetrafluoroboric acid in said acidic solvent is between 1 and 5 molar.

8. A process as claimed in claim 7, in which the manganese tetrafluoroborate concentration in said mixed solution subjected to electrolysis is between about 0.2 and 2 molar.

9. A process as claimed in claim 8, in which the zinc tetrafluoroborate concentration in said mixed solution subjected to electrolysis is between about 0.2 and 2 molar.

10. A process as claimed in claim 9, wherein the pH of said mixed solution subjected to electrolysis is maintained in the range between pH 1 and pH 4.5.

11. A process as claimed in claim 10, wherein the pH during the electrolysis is maintained in the range between pH 1.0 and pH 3.0.

12. A process as claimed in claim 11, wherein the temperature of the solution subjected to electrolysis is between about 50° C. and about 90° C.

13. A process as claimed in claim 12, wherein the said temperature is between 75° C. and 80° C.

14. A process as claimed in claim 13, wherein the anodic current density is between about 10 mA/cm$^2$ and 50 mA/cm$^2$.

15. A process as claimed in claim 14, wherein the anodic current density is between 15 mA/cm$^2$ and 20 mA/cm$^2$.

16. A process as claimed in claim 15, wherein the cathode material of the electrolysis cell is selected from the group consisting of polished aluminum, stainless steel and titanium.

17. A process as claimed in claim 16, wherein the anode material of the electrolysis cell is graphite.

18. A process as claimed in claim 16, wherein the anode material of said electrolysis cell is titanium with a coating selected from the group consisting of ruthenium and iridium oxides.

19. A process as claimed in claim 3, wherein the pH of said mixed solution subjected to electrolysis is maintained in the range between pH 1 and pH 4.5.

20. A process as claimed in claim 19, wherein the temperature of the solution subjected to electrolysis is between about 50° C. and about 90° C.

21. A process as claimed in claim 20, wherein the anodic current density is between about 10 mA/cm$^2$ and about 50 mA/cm$^2$.

22. A process as claimed in claim 21, wherein the anode material of the electrolysis cell is graphite.

23. A process as claimed in claim 21, wherein the anode material of said electrolysis cell is titanium with a coating selected from the group consisting of ruthenium and iridium oxides.

24. A process as claimed in claim 3, wherein the anode material of the electrolysis cell is graphite.

25. A process as claimed in claim 3, wherein the anode material of said electrolysis cell is titanium with a coating selected from the group consisting of ruthenium and iridium oxides.

* * * * *